US008921743B2

(12) United States Patent
Ewell, Jr. et al.

(10) Patent No.: US 8,921,743 B2
(45) Date of Patent: Dec. 30, 2014

(54) DEVICE AND METHOD FOR MONITORING A HEATING APPLIANCE

(71) Applicants: Robert C. Ewell, Jr., Ballston Spa, NY (US); Douglas L. Garmany, Pineland, TX (US); Charles T. Kelly, Houston, TX (US); Charles Philip Wasilewski, Great Falls, MT (US)

(72) Inventors: Robert C. Ewell, Jr., Ballston Spa, NY (US); Douglas L. Garmany, Pineland, TX (US); Charles T. Kelly, Houston, TX (US); Charles Philip Wasilewski, Great Falls, MT (US)

(73) Assignee: Stovminder, LLC, Houston, TX (US)

( * ) Notice: Subject to any disclaimer, the term of this patent is extended or adjusted under 35 U.S.C. 154(b) by 0 days.

(21) Appl. No.: 14/107,720

(22) Filed: Dec. 16, 2013

(65) Prior Publication Data

US 2014/0120219 A1 May 1, 2014

Related U.S. Application Data

(63) Continuation-in-part of application No. 12/909,902, filed on Oct. 22, 2010, now Pat. No. 8,610,036.

(51) Int. Cl.
*H05B 1/02* (2006.01)
*A47J 27/62* (2006.01)

(52) U.S. Cl.
CPC ............... *A47J 27/62* (2013.01); *H05B 1/0261* (2013.01)
USPC ..................... 219/492; 219/445.1; 219/448.1; 219/606; 219/483; 219/412; 340/870.16; 99/325; 392/418

(58) Field of Classification Search
CPC ...... H05B 1/02; H05B 1/0202; H05B 1/0261; H05B 1/0252; H05B 1/0258; H05B 1/0263; H05B 3/008; H05B 6/12; H05B 6/1245
USPC .............. 219/445.1, 448.1, 412–414, 448.12, 219/446.1, 481, 497, 494, 483–487, 606; 340/870.16, 870.17, 573.1, 588, 686.6, 340/FOR. 103; 99/325, 332, 337, 342, 344; 431/13, 75; 392/416–418
See application file for complete search history.

(56) References Cited

U.S. PATENT DOCUMENTS

| | | | |
|---|---|---|---|
| 4,782,420 | A | 11/1988 | Holdgaard-Jensen |
| 5,318,224 | A | 6/1994 | Darby et al. |
| 5,541,579 | A | 7/1996 | Kiernan |
| 5,608,383 | A | 3/1997 | Neil |
| 5,628,242 | A | 5/1997 | Higley |
| 5,717,188 | A | 2/1998 | Vaillancourt |

(Continued)

*Primary Examiner* — Mark Paschall

(74) *Attorney, Agent, or Firm* — Schmeiser, Olsen & Watts, LLP

(57) ABSTRACT

Disclosed herein is a system for monitoring a heating apparatus that includes a motion detector configured to determine whether a person is proximate the heating apparatus. The motion detector is default deactivated. Further disclosed is a heat sensor configured to determine whether the heating apparatus has a temperature that is above a threshold. The heat sensor is default deactivated. A processor is in operable communication with each of the motion detector and the heat sensor configured to cyclically repeat a first countdown. The heat sensor is temporarily activated once during each of the repeated first countdowns. The processor is configured to perform a second countdown when the activated heat sensor determines that the heating apparatus has the temperature that is above the threshold. The second countdown is reset each time the motion detector determines that a person is proximate the heating apparatus. Further disclosed is a transmitter configured to send data signals to an outside device when the processor reaches the end of the second countdown, and a receiver configured to receive data signals from the outside device.

20 Claims, 8 Drawing Sheets

(56) References Cited

U.S. PATENT DOCUMENTS

| | | | | |
|---|---|---|---|---|
| 5,723,846 | A * | 3/1998 | Koether et al. | 219/497 |
| 5,734,206 | A | 3/1998 | Keizer et al. | |
| 5,796,346 | A | 8/1998 | Wash et al. | |
| 5,805,767 | A | 9/1998 | Jouas et al. | |
| 5,909,378 | A | 6/1999 | De Milleville | |
| 5,945,017 | A | 8/1999 | Cheng et al. | |
| 6,013,901 | A | 1/2000 | Lavoie | |
| 6,130,413 | A | 10/2000 | Rak | |
| 6,294,994 | B1 | 9/2001 | Hoellerich | |
| 6,411,215 | B1 | 6/2002 | Shnier | |
| 7,002,109 | B2 | 2/2006 | Klask | |
| 7,005,986 | B2 | 2/2006 | Parks, III et al. | |
| 7,798,139 | B2 * | 9/2010 | Gagas et al. | 126/25 R |
| 7,802,618 | B2 | 9/2010 | Simon et al. | |
| 2009/0017404 | A1 | 1/2009 | White et al. | |

* cited by examiner

DEVICE AND METHOD FOR MONITORING A HEATING APPLIANCE

RELATED APPLICATIONS

This application is a continuation-in-part application of and claims priority from co-pending U.S. patent application Ser. No. 12/909,902 filed Oct. 22, 2010, and entitled "Device and Method for Monitoring a Heating Appliance," which is incorporated herein by reference in its entirety.

FIELD OF THE INVENTION

The subject matter disclosed herein relates generally to a device and method for monitoring a heating appliance. More particularly, the subject matter relates to a device and method for alerting a user when a heating appliance is on and left unattended.

BACKGROUND OF THE INVENTION

Heating appliances such as stoves, ovens, grills, fryers, and the like should be monitored regularly when in use. Forgetting about a heating appliance may result in an over cooked meal. However, an overcooked meal may be a minor concern when compared with the potential safety hazard caused by leaving a heating appliance unattended. This is because items left on the stove, oven, grill, fryer, and the like may overheat, resulting in the production of smoke and fire. In such a situation, a standard fire alarm may not alert a user until after flames have already ignited. This is because fire alarms typically sense the presence of smoke, which is an immediate precursor to a fire. As a result, heating appliances can be extremely dangerous to an unwary and forgetful user.

Thus, a device and method for alerting a user when a heating appliance is on and left unattended would be well received in the art.

BRIEF DESCRIPTION OF THE INVENTION

According to one aspect, a system for monitoring a heating apparatus comprises: a motion detector configured to determine whether a person is proximate the heating apparatus, wherein the motion detector is default deactivated; a heat sensor configured to determine whether the heating apparatus has a temperature that is above a threshold, wherein the heat sensor is default deactivated; a processor in operable communication with each of the motion detector and the heat sensor configured to cyclically repeat a first countdown, and wherein the heat sensor is temporarily activated once during each of the repeated first countdowns, and wherein the processor is configured to perform a second countdown when the activated heat sensor determines that the heating apparatus has the temperature that is above the threshold, and wherein the second countdown is reset each time the motion detector determines that a person is proximate the heating apparatus; a transmitter configured to send data signals to an outside device when the processor reaches the end of the second countdown; and a receiver configured to receive data signals from the outside device.

According to another aspect, a method for monitoring a heating apparatus, comprises: repeating a first countdown of a first set period with a processor; activating a heat sensor at the end of each of the repeated first countdowns, the heat sensor configured to determine whether the heating apparatus has a temperature that is above a threshold; performing a second countdown of a second set period with the processor when the heat sensor determines that the heating apparatus has the temperature that is above the threshold; detecting motion with a motion sensor when the heat sensor determines that the heating apparatus has a temperature that is above the threshold; resetting the second countdown when motion is detected by the motion sensor; transmitting data signals to an outside device when the processor reaches the end of the second countdown; and receiving data signals from the outside device.

According to yet another aspect a device for monitoring a heating apparatus comprises: a motion detector configured to determine whether a person is proximate the heating apparatus, wherein the motion detector is default deactivated; a heat sensor configured to determine whether the heating apparatus has a temperature that is above a threshold, wherein the heat sensor is default deactivated; a processor in operable communication with each of the motion detector and the heat sensor configured to cyclically repeat a first countdown, and wherein the heat sensor is temporarily activated once during each of the repeated first countdowns, and wherein the processor is configured to perform a second countdown when the activated heat sensor determines that the heating apparatus has the temperature that is above the threshold, and wherein the second countdown is reset each time the motion detector determines that a person is proximate the heating apparatus; a transmitter configured to send data signals to an outside device when the processor reaches the end of the second countdown; and a receiver configured to receive data signals from the outside device.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
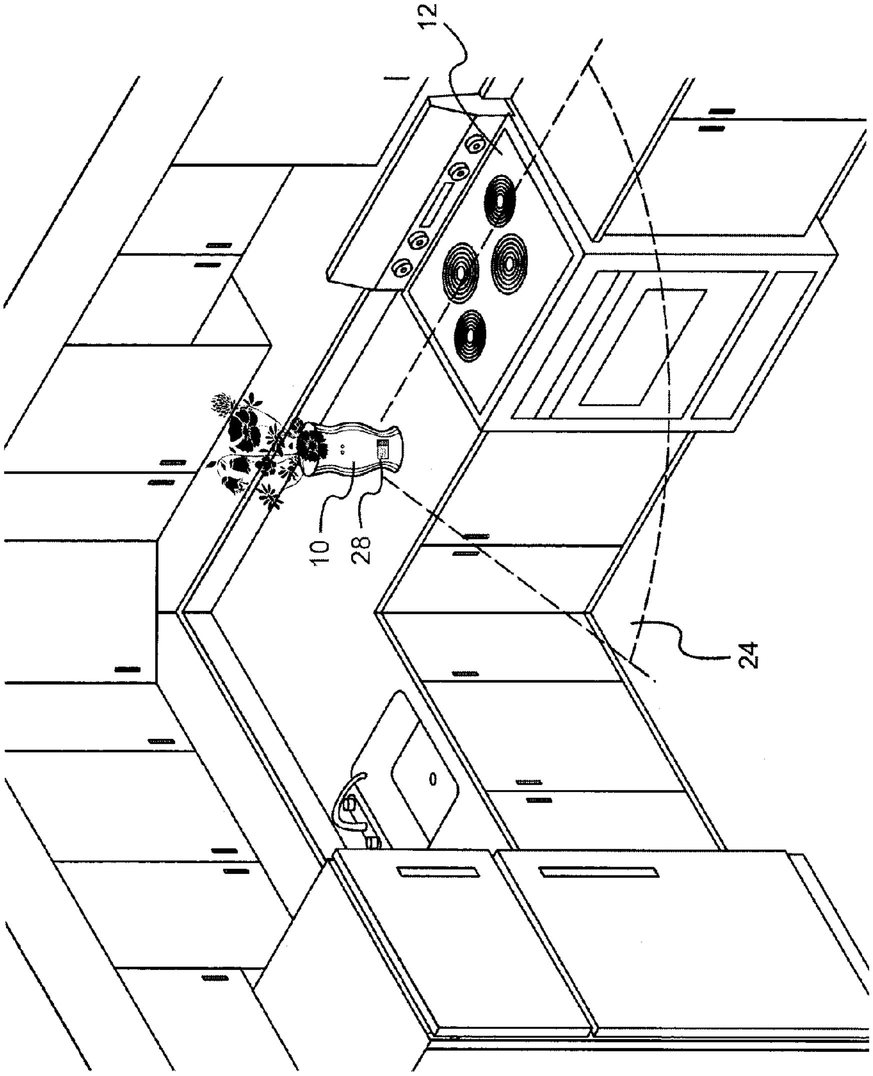
FIG. 1 depicts a perspective view of a device located on a countertop in proximity of a stove top in accordance with one embodiment.
Figure 2:
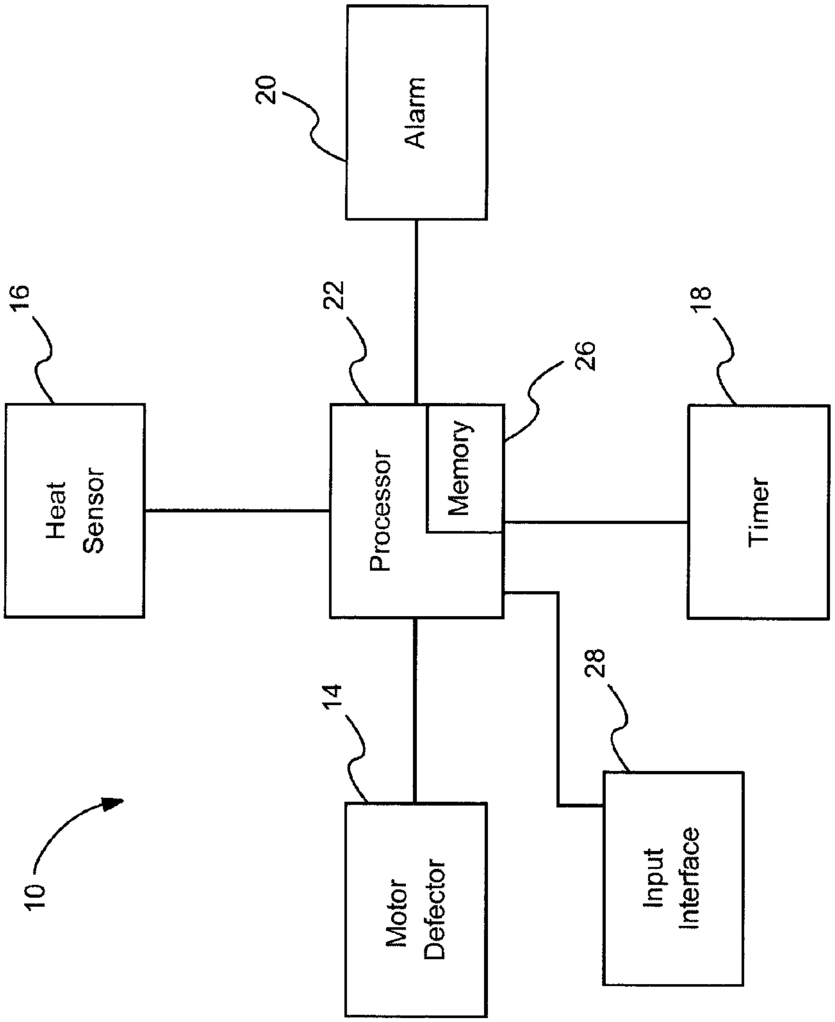
FIG. 2 depicts a schematic view of the device for monitoring the heating appliance of FIG. 1 in accordance with one embodiment.
Figure 3:
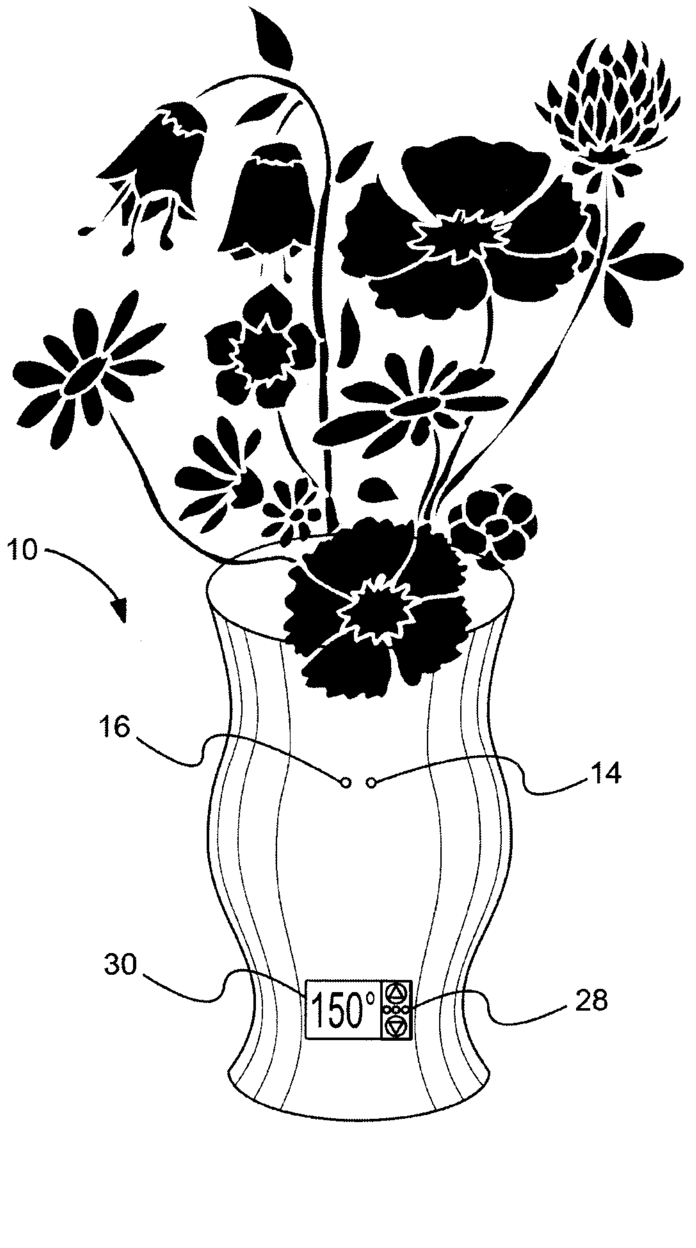
FIG. 3 depicts a perspective view of the device of FIG. 1 in accordance with one embodiment.

Referring firstly to FIGS. 1-3, there is shown a device 10 for monitoring a heating apparatus 12. While the heating apparatus 12 may be a stove as shown in FIG. 1, other heating apparatuses are contemplated. For example, it should be understood that the device 10 may be configured to monitor ovens, grills, fryers, or the like. The device 10 may be encased into a typical kitchen apparatus, such as flower vase as shown in the Figures. However, other kitchen apparatuses are contemplated such as spice racks, knife holders, utensils, clocks, coffee makers, tea pots, or the like. It should be understood that any apparatus that would typically be used, or look natural, on a countertop is contemplated. Alternately, the device 10 may be hangable from a ceiling. In this embodiment, the device 10 may be integrated into a hanging light or fan, for example. Furthermore, the device 10 may simply be attachable or integrated into the heating appliance 12 itself. The device 10 includes a motion detector 14, a heat sensor 16, a timer 18, an alarm 20, and a processor 22 that work in conjunction to alert a user that the heating appliance 12 has been left unattended. The device 10 is placeable in the proximity of the heating apparatus 12 such that the heat sensor 16 is able to detect the temperature of the heating appliance 12 and the motion detector 14 is able to detect movement in a proximity area 24 of the heating appliance 12. It should be understood that embodiments of the device 10 may be battery powered, solar powered, or may be plugged in to an outlet.

The motion detector 14 may further be deactivated by default. This may be advantageous in order to conserve energy that is used by the device 10 or battery life of the device 10. The motion detector 14 may be an infrared sensor, or any type of sensor that is able to detect whether a user is in the proximity of the heating apparatus 12. The motion detector 14 may be particularly configured to detect motion only in an area 24 proximate the heating appliance 12. Thus, the motion detector 14 may be able to detect that a user has walked by or maintaining a presence at the heating appliance 12 and is presumably aware of the temperature and heating state of the heating appliance 12. The motion detector 14 may be able to distinguish this proximate motion at the heating appliance 12 with other movements that occur at farther distances from the heating appliance 12. This is because movement occurring too far from the heating appliance 12 may not indicate that the user is currently aware of the temperature and heating state of the heating appliance 12. In one embodiment, the motion detector 14 may simply not be able to detect motion that occurs at a location that is farther than a predetermined distance. Alternately, the processor 22 may be able to distinguish this proximate movement from the movement occurring at a predetermined distance from the heating appliance 12. Furthermore, the motion detector 14 may be able to distinguish the height at which the movement occurs. The motion detector 14 may be configured to not detect motion that is below a certain height so that the device 10 can distinguish between children and adults in the vicinity of the heating appliance 12. Alternately, the motion detector 14 can sense motion at any height and the processor 22 may distinguish that motion of a certain height means that a user is currently aware of the heating appliance 12. While the embodiment depicted includes a single motion detector 14, it may be beneficial to include a plurality of motion detectors. For example, a plurality of motion detectors 14 may be able to detect in a broader area of space around the proximity of the heating apparatus 12.

Like the motion detector 14, the heat sensor 16 may also be deactivated by default. Again, this may be advantageous in order to conserve energy that is used by the device 10 or battery life of the device 10. The heat sensor 16 may be an infrared sensor, or any other sensor known to those skilled in the art that can make an exact or approximate determination of the temperature of an object or the amount of heat radiating from an object. In one embodiment, the heat sensor 16 and the motion detector 14 may be the same sensor. Thus, the heat sensor 16 may also detect motion in the vicinity of the heating apparatus 12. However, in the embodiment depicted, the device 10 includes two separate sensors 14, 16 to motion and heat respectively. While the embodiment depicted includes a single heat sensor 16, it may further be beneficial to include a plurality of each of these detection mechanisms. For example, a plurality of heat sensors 16 may be able to detect in a broader area of space.

The timer 18 may be configured to cyclically repeat a first countdown. At the end of the first countdown, the heat sensor 16 may be activated temporarily in order to sense heat being emitted from the heating apparatus 12. The period of the first countdown may be, for example, 10 minutes. Other periods are contemplated. For example, the period of the first countdown may be between five minutes and thirty minutes. The period of the first countdown should be set such that the heating apparatus 12 may be on for this length of time without being hazardous. The timer 18 is configured to perform a second countdown when the activated heat sensor 16 determines that the heating apparatus 12 is on. The second countdown may have the same period as the first countdown, or a different period, depending on the embodiment. When the second countdown is being performed, the motion detector 14 may be activated. When motion is detected, the second countdown may be reset such that the period must be re-counted. This resetting may continue each time motion is detected by the motion detector 14. However, if the second countdown reaches the end without any detected motion, the alarm 20 may be configured to notify a user that the heating apparatus 12 is left unattended.

It should be understood that the alarm 20 may be an audible alarm. Thus, the device 10 may include one or more speakers so that the alarm is loud enough to alert a user that may be in another room from the heating appliance 12. The audible waves of the alarm may have a frequency and amplitude of a typical fire alarm. However, other embodiments are contemplated. For example, the alarm 20 may also be a visual alarm. This may be particularly beneficial when a user is hearing impaired. Of course, the alarm 20 may include both audible and visual components. Furthermore, the device 10 may send a signal to an off-site remote alarm (not shown) in addition to the integrated alarm 20. The off-site alarm may be an alarm similar to the alarm 20 in another room of the house than the room that the device 10 is in. For example, the device may send a signal to an off-site alarm in a study or living room. Furthermore, the off-site remote alarm may signal to a user that is located completely out of the house that the heating apparatus 12 is located. For example, the device 10 may be configured to automatically notify a user's cell phone, computer, telephone or any other device. In the case that the device 10 contacts a user's cell phone to alarm the user, the user may be required to download an application that allows for communication with the device 10 in order to alarm the user in a similar manner to the alarm 20 as described herein above.

Furthermore, the timer 18 may be configured to stop the second countdown and revert back to the initial first countdown when the heat sensor 16 determines that the temperature is back below the threshold. Thus, the heat sensor 16 may be active during the second countdown, either continuously or temporarily at intervals. Furthermore, even if the heat sensor 16 determines that the temperature is above the threshold, the timer 18 may be configured to stop the second countdown and revert back to the first countdown when the heat sensor 16 determines that the temperature of the heating apparatus 12 is steadily declining. This may signal to the device 10 or the processor 22 that the heating appliance 12 is turned off and may prevent the alarm 20 from inadvertently notifying a user in such a situation.

Shown in FIG. 2 is a schematic view of the device 10 including the motion detector 14, the heat sensor 16, the timer 18, the alarm 20 and the processor 22. Any or all of the motion detector 14, the heat sensor 16, the timer 18, the alarm 20 and the processor 22 may be located within the housing of the device 10. As shown, the operations of the timer 18 in conjunction with the heat sensor 14, the motion detector 16, and the alarm 20, as described hereinabove, may be controlled and directed by the processor 22. It should further be understood that the device 10 may also include memory 26 that is connected to the processor 22 for storing the programming to perform the functions described hereinabove. Alternately or in addition to the memory 26, the device 10 may also be controlled through firmware that is embedded into the device 10 or the processor 22.

Referring more specifically to FIG. 3, the device 10 may include an input interface 28. The input interface 28 may allow a user to change the period of least one of the first countdown and the second countdown. Thus, the input interface 28 may include a user display 30 for displaying the settings to the user. The input interface 28 may be a simple toggle that provides for the shortening or extension of either or both of the countdowns. For example, the user interface 28 includes up and down arrows for increasing or decreasing the numerical value inputs. Other functions of the device 10 may also be altered by a user through the input interface 28. For example, the threshold temperatures described hereinabove may also be toggled. Thus, low simmering temperatures may be prevented from triggering the device 10 from entering into the second countdown. The input interface 28 may or may not include an on/off switch for the device 10. In one embodiment, for example, there may not be an on/off switch for the device 10 because the device 10 is always in an "on" state as long as it is plugged in, has charged batteries, or is otherwise powered. In this "on" state there may be no way to deactivate the device 10, other than unplugging, removing batteries, or otherwise unpowering the device 10. Furthermore, this "on" state should not be meant to imply that the heat sensor 16 and the motion detector 14 are always "on" but rather that the internal timer 18 is performing its countdowns and turning the heat sensor 16 and the motion detector 14 "on" at various intervals as described herein.

Figure 4:
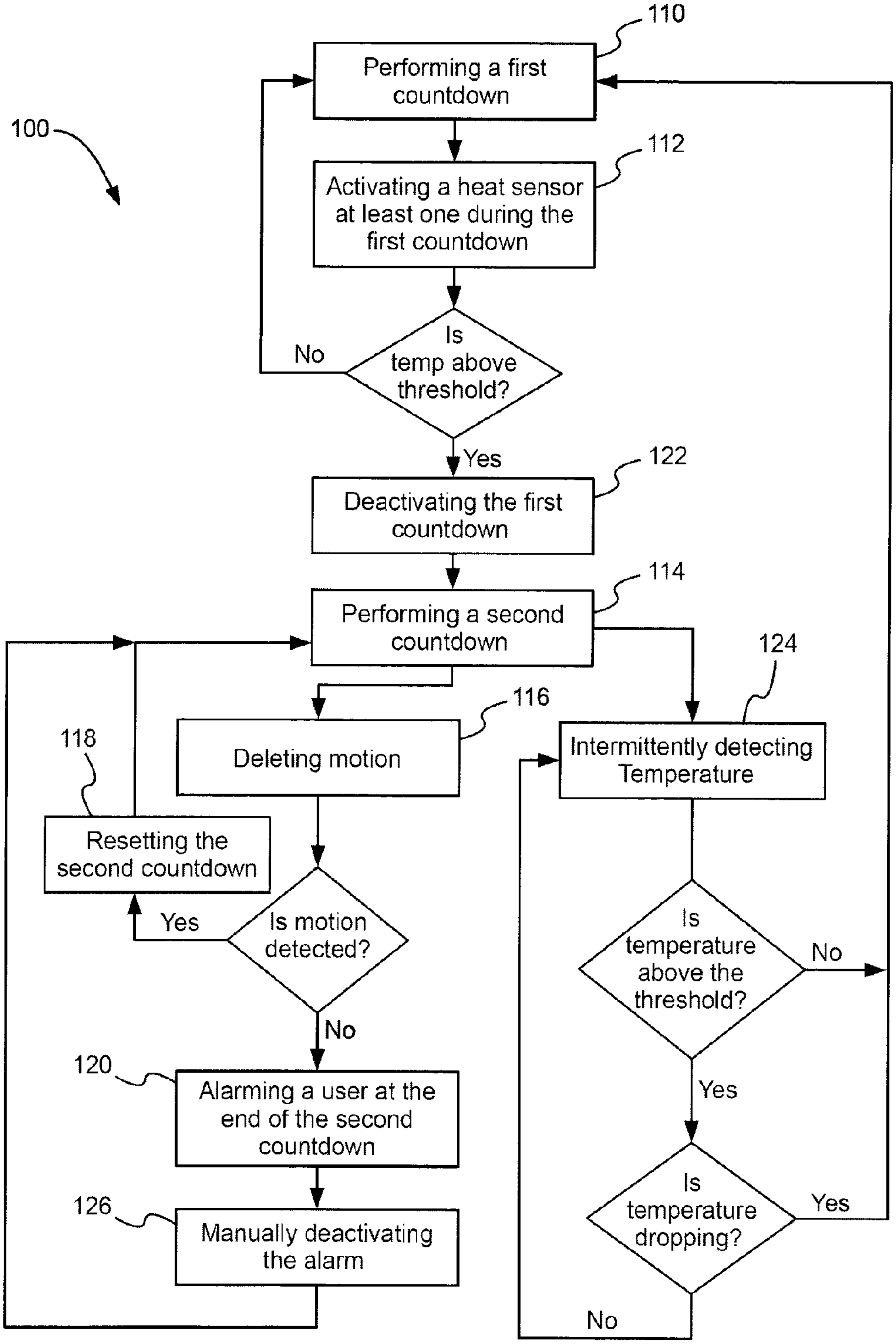
FIG. 4 depicts a flow diagram of a method for monitoring a heating appliance in accordance with one embodiment.

Referring now to FIG. 4, a flow diagram of a method 100 for monitoring a heating appliance, such as the heating appliance 12, is shown. The method 100 first includes a step 110 of performing a first countdown of a first set period with a timer, such as the timer 18. The method 100 then includes a step 112 of activating a heat sensor, such as the heat sensor 14, once during each of the repeated first countdowns. The heat sensor may be configured to determine whether the heating apparatus has a temperature that is above a threshold. If the heat sensor determines that the heat is below the threshold, the first countdown is repeated. If the heat sensor determines that the heat is above the threshold, the method 100 may then proceed to a step 114 of performing a second countdown of a second set period with the timer.

During the second countdown, the method 100 includes a step 116 detecting motion with a motion sensor, such as the motion sensor 16, when the heat sensor determines that the heating apparatus has a temperature that is above the threshold. Next, the method 100 includes a step 118 of resetting the second countdown when motion is detected by the motion sensor. The method 100 then involves a step 120 of alarming a user when the timer reaches the end of the second countdown. It should be understood that the method 100 may further include providing a single device for housing the heat sensor, the timer, the motion sensor and the alarm. Further, the method 100 may include a step 126 of manually deactivating the alarm by a user. The method 100 may further include a step 122 of deactivating the first countdown of the timer when the timer is performing the second countdown.

Furthermore, the method 100 may include a step 124 of intermittently detecting the temperature of the heating apparatus with the heat sensor during the second countdown. It should be understood that the intermittent temperature detection may have the same countdown period as the first countdown period. Further, the intermittent detecting step 124 may be being performed by the method 100 during the detecting motion step 116 during the second countdown. Furthermore, the method 100 may include a step 126 of reverting back to the first countdown if it is determined that either: (1) the temperature is below the threshold; or (2) that the temperature is decreasing, as described hereinabove. If the temperature remains above the threshold and the temperature is not dropping, the step of intermittently detecting temperature 124 may continue.

Figure 5:
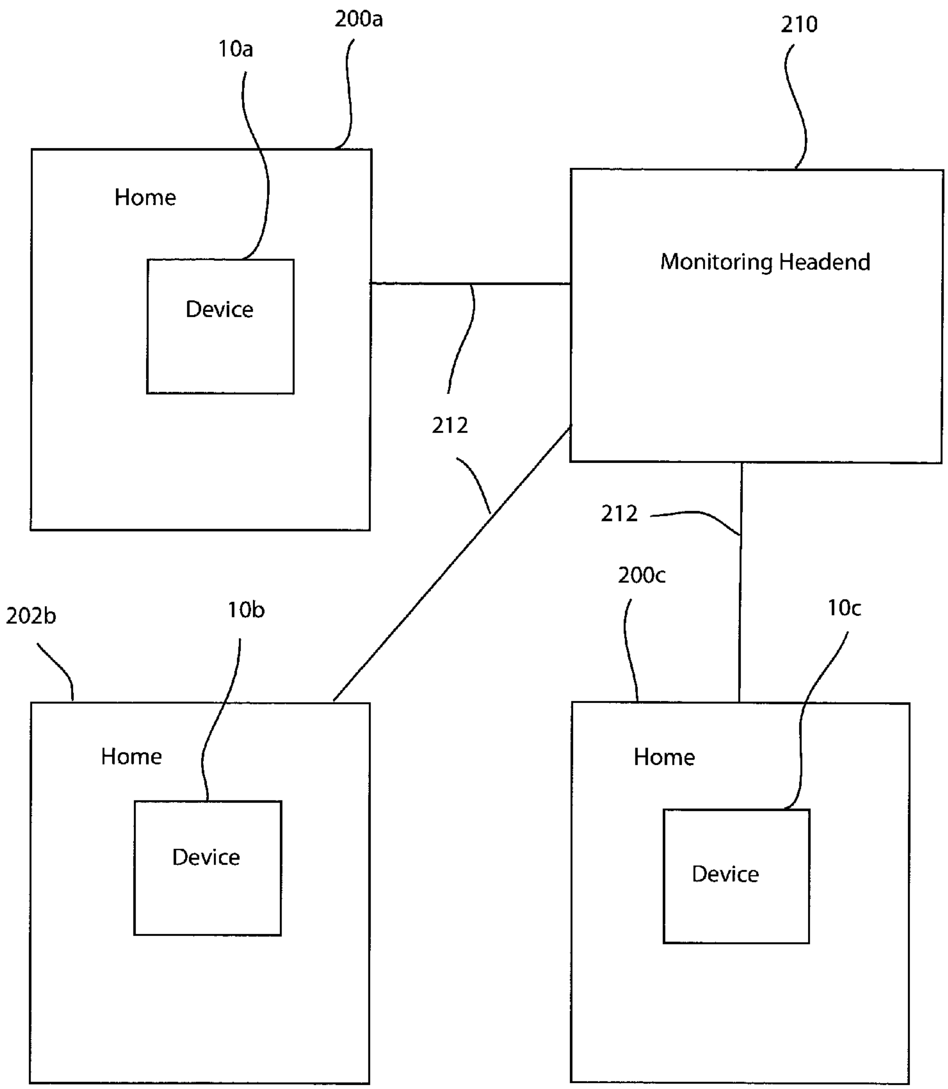
FIG. 5 depicts a schematic view of a system including a device and monitoring headend in accordance with one embodiment.

Referring now to FIG. 5, in another embodiment, the device 10 may be configured to send information to a remote location such as a monitoring headend 210. In this embodiment, the device 10 may be located in a user's home 200. The monitoring headend 210 may not be located within the user's home 200, but rather may be located off site and connected via a network 212. The monitoring headend 210 may provide for monitoring of multiple devices 10 such as a first device 10*a*, a second device 10*b*, and a third device 10*c* located in a first home 200*a*, a second home 200*b*, and a third home 200*c*. The monitoring head end 210 may thus be connected to any number of the devices 10 located in any number of homes 200. The monitoring headend 210 may be a service provided by the manufacturer or distributor of the device 10. A single monitoring headend 210 may monitor hundreds or thousands of devices 10 simultaneously. The monitoring headend 210 may be configured to both receive information from the device 10, but may also send information back to the devices 10, or other systems found in the home 200, such as alarm systems, doorbells, telephones, mobile phones, televisions, or the like. Moreover, the monitoring headend 210 may be configured to send a signal to the device 10 in order to operate the device 10. For example, the monitoring headed 210 may be configured to turn on the device 10 at a user or homeowner's request. The monitoring headend 210 may be configured to turn on the motion sensor of the device 10 in order to allow the device to see if a person was in the vicinity of the stove in real time, or to see if a cook was there recently, or to monitor for how long there has been no movement in the vicinity of the device 10. The monitoring headend 210 may further store any information provided by the device 10 in a database which can be accessed by a user at a later time.

It should further be understood that the device 10 may actually be a system, rather than a single device with a single housing. In other words, the system may include a separate alarm component, motion detector component, heat detector component, smoke detector component, carbon detector component, processor, data storage location, and the like. These components may be separate components that are located at various locations in a room or house to optimize functionality of the system. Thus, when "the device" is referred to here, it should be understood that a single device, or a multi-component system are contemplated.

The monitoring headend 210 may further be a video monitoring system or service. In this embodiment, the expiration of the second countdown and the activation of the alarm may alert the monitoring headend 210 in order to do a video search of the relevant room, i.e. kitchen, to determine if there is a fire or other dangerous situation. The monitoring headed 210 may respond accordingly, should such a situation be present.

In one embodiment, the device 10 may actually include an attached camera. The camera may be viewable remotely from a cell phone, through a wireless Wi-Fi system or hard wired security system. This camera could provide the installer with a means of ensuring that the device 10 was facing the proper direction for ensuring motion will be properly detected. The camera and video information could also be accessible by the headed 210.

Thus, the device 10 may be configured to both send and receive data signals and information. The device 10 may be a full duplex communication system, or may alternately be a half-duplex communication system. Because of the capabilities of the device 10 to both receive and send data signals, the device may be remotely controllable via blue tooth, radio, an internet link, a cell phone, a satellite, or other remove media. Moreover, the device 10 may further be configured to store data or information at a remove server, or internally within the device, for later collection in applications which are accessible via computers, tablets, laptops, mobile communicators (cell phones), and the like.

In assisted living situations, it should be understood that the monitoring headend 210 may be a central monitoring station in an assisted living facility. In this way, the assisted living facility may monitor the status of the device 10, and would know when the alarm was sounded due to the expiration of the second countdown with no movement. In this embodiment, the staff members of the assisted living facility could check in on the room as soon as the alarm information was provided to the monitoring headed 210 of the assisted living facility.

In other embodiments, the computing power of the device 10 may be found in the cloud. In other words, the device 10 may be set up to wirelessly connect to a local wireless network. Once connected, the device 10 may be configured to interact with the cloud in order to reduce the computational power required from the device 10. For example, the determination of when to alarm or notify a user may be made by calculations occurring at a remote location or server, such as at the monitoring headend 210. The device 10 may not need to be equipped to perform such calculations or algorithms.

The device 10 may further use Wi-Fi to communicate with other household devices in range. For example, the device 10 may further communicate with a home alarm system. This may allow the device 10 to sound an alarm in other locations of the house if the conditions for the alarm have been met, as described hereinabove. For example, if the internal timer reaches end of the second countdown, the device 10 may be configured to sound a local alarm directly from a speaker in the device 10, but additionally the device 10 may communicate with other alarms found in various other locations of the home to also sound the alarm. The device 10 may further be configured to set off alarms or warnings in a hierarchy or order. For example, upon the second countdown expiring with no movement in the vicinity, the device 10 may be configured to sound the local alarm. If, after a predetermined time (i.e. one or more minutes), no movement is found proximate the device 10, the device 10 may set an alarm in other rooms of the house. Next, if there is still no movement after a predetermined amount of time, the device 10 may call a pre-programmed cell phone or telephone number of a user. This call may be pre-recorded with an automated reminder message. Finally, if there is no movement after another set amount of time, the device may contact the authorities, or may contact the monitoring headend 210. It should be understood that this is just one example of a hierarchical order which ascends in intrusiveness as the time progresses. The hierarchy may further include a single alarm becoming increasingly louder, or otherwise intrusive, as time goes on.

Figure 6:
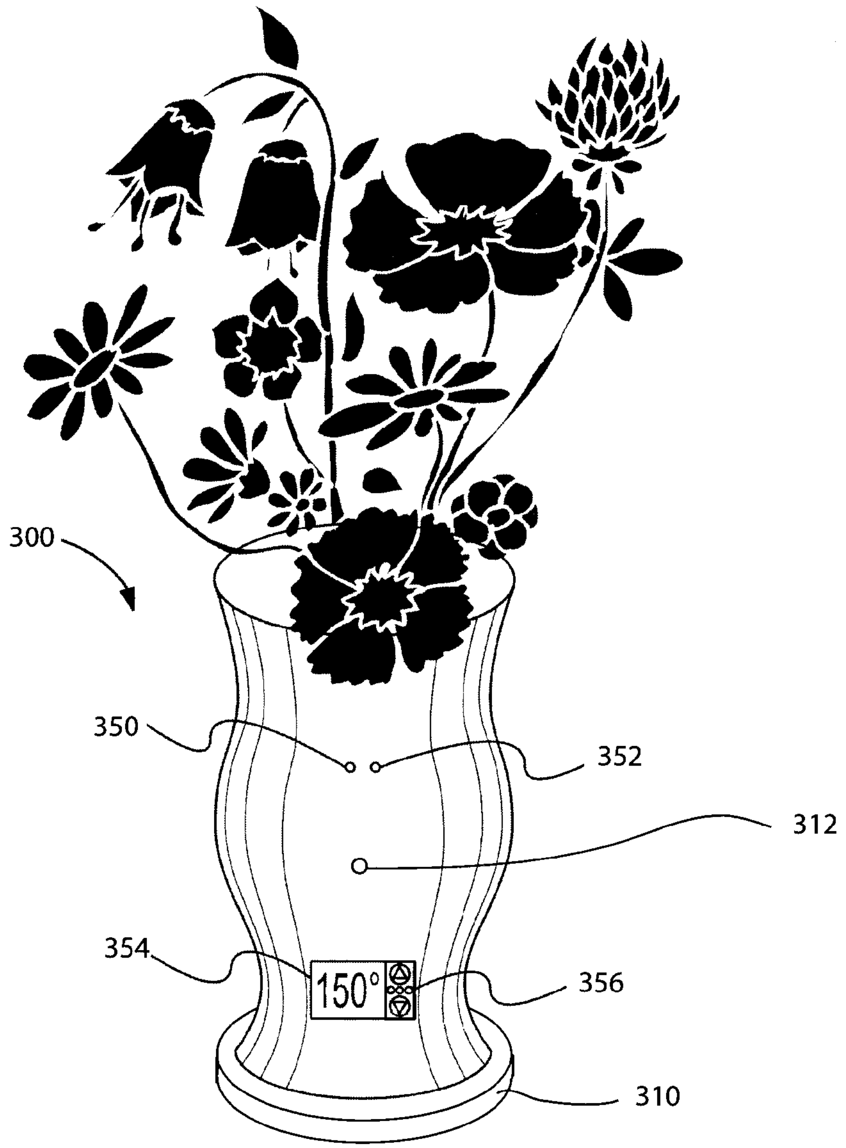
FIG. 6 depicts a perspective view of a device located on a countertop in proximity of a stove top in accordance with one embodiment.

Another embodiment of a device 300 is shown in FIG. 6. The device 300 may be similar to the device 10 in all respects. Thus, the device 300 may, for example, include a heat sensor 350, a motion detector 352, a user display 354, and an input interface 356. The device 300 may further include a processor (not shown). However, the device 300 may further include a base 310. The base 310 may be a stationary element which is adhered, bolted, or otherwise permanently attached to a countertop, wall or ceiling. The base 310 may include a keyed opening or bore such that the device 300 may be insertable into the keyed opening or bore to rest therein. Because the opening or bore is keyed, the device 300 may be specifically insertable into the opening in a single position such that it is always pointed in the direction of the stove. Therefore, the device 300 is prevented from being replaced into the base 310 in an incorrect position or facing an incorrect direction. The base 310 may include a charger, in one embodiment. This may allow a user to remove the device 300 from the base 310 in order to clean the device 300 or otherwise service the device 300, and then replace the device consistently in the proper orientation, position, and direction for monitoring.

Still further, the device 300 may include a laser pointer 312 or beam. The laser pointer 312 or beam may be configured to shine a laser in the direction that the device 300 motion sensors are pointing to indicate to a user how to orient the device 300 to ensure the motion sense is pointed in the proper direction. This laser may shine either as a direct point, or may shine in an area, where the area is the area that the device 300 is able to detect motion within, for example. The same laser or a second laser (not shown) may be utilized in order to determine the direction in which the heat sensor is pointed, or even a smoke sensor. In another embodiment, the device 300 may not include a motion sensor integrated within. Rather, the device 300 may communicate wirelessly with a different motion sensor that was set at a different location in a room, or a different room altogether. This may enable the system to get a better view of the area that is being detected. The motion sensor may even be part of a security system installed in the home. In this way, the device 300 may be an integral component to a home security system.

In one embodiment, the device 10, 300 may include temperature adjustments in order for a user to set a particular temperature below which the device 10, 300 may not be configured to alarm the user. For example, if a user was cooking a stew all day at a low temperature, the device 10, 300 may be set to refrain from entering into the internal timer sequence. Likewise, time may also be adjustable. In this embodiment, the time of the first and second countdowns may be set by the user. Additionally, the time may revert back to default settings after a cooking session finishes. Thus, if a user sets the timer to 20 minutes once to slow cook a particular meal, the next time the user attempts to cook again, the slow set timer will not remain. This may prevent settings being adjusted for dangerously long times.

In one embodiment, the device 10, 300 may be configured to call an owner's mobile communicator, cell phone, telephone, or other device to notify the user that the battery of the device 10, 300 is running low. Alternately, this telephonic communication may notify the user that the device 10, 300 has not detected movement despite the heat of the stove or oven being on for the set period of time. Rather than sending a telephonic communication, the device 10, 300 may instead send out a communicating signal to a home system in order to wirelessly shut off a gas valve to the stove or to the house itself. In the same way, the device 10, 300 may send a signal which cuts electricity to the stove or oven, or turns off the power of the stove or oven.

In a further embodiment, the device 10, 300 may include a smoke and carbon detector (such as carbon dioxide and/or carbon monoxide). These detectors may, for example, be default disabled and may be activated as part of a hierarchy of alarms, as described hereinabove. If the device 10, 300 detects the absence of motion during the second countdown, the device 10, 300 may turn on a smoke alarm and/or carbon alarm. These additional alarms may look for a proof of fire and respond accordingly. For example, the device 10, 300 may sound an alarm if fire was detected or contact the monitoring headed 210 or other appropriate authority. The smoke detector and carbon detector may further be included in the hierarchy of alarms which are enabled the longer the device 10, 300 remains without detecting movement. Still further, the device 10, 300 may be in operable communication with the HVAC system of a household. The device 10, 300 may send a controlling signal to the HVAC system if smoke, carbon dioxide or carbon monoxide is detected. This signal may be sent, for example, via blue tooth or over Wi-Fi or via a wired connection. The signal may be configured to stop the fan operations of the HVAC system in order to prevent the spread of dangerous gases in the household.

Motion detected by the motion detector 352 may not be configured to shut off the alarm in all cases. For example, in one embodiment, if the alarm has been sounding for a set elongated length of time, the detection of motion will not impact the alarm. Thus, if the alarm has been sounding for this set elongated length of time, the alarm may be required to be reset manually, rather than simply by the detection of motion. This may prevent the device 300 from detecting motion in the form of smoke to turn off the alarm. Smoke may appear increasingly like movement to the motion detector 352 the more invasive it pervades a room. As such, this feature should prevent the device 300 from turning off the alarm when there is simply a lot of smoke being detected. In other embodiments, the device 300 may otherwise detect the difference between human motion and smoke motion. It should be understood that these features may be applied to any of the devices described herein.

In still another embodiment, alarm information may be sent from the device 10, 300 to an insurance carrier. In this embodiment, the purchase of the device 10, 300 may reduce a homeowners premium due to the safety the device 10, 300 provides for the home. However, the reduced premium may be subject to monitoring by the insurance companies to make sure any unsafe activity does not occur, or does not occur frequently.

The device 10, 300 may further sound an alarm when the device 10, 300 needs to be cleaned. For example, the device 10, 300 may be able to sense when the motion monitoring lens is covered or dirty. The alarm may be a different alarm than the notification alarm that occurs when the device 10, 300 reaches the end of the second countdown. The cleaning alarm may also be activated when a predetermined amount of time has passed since the most recent cleaning.

Figure 7:
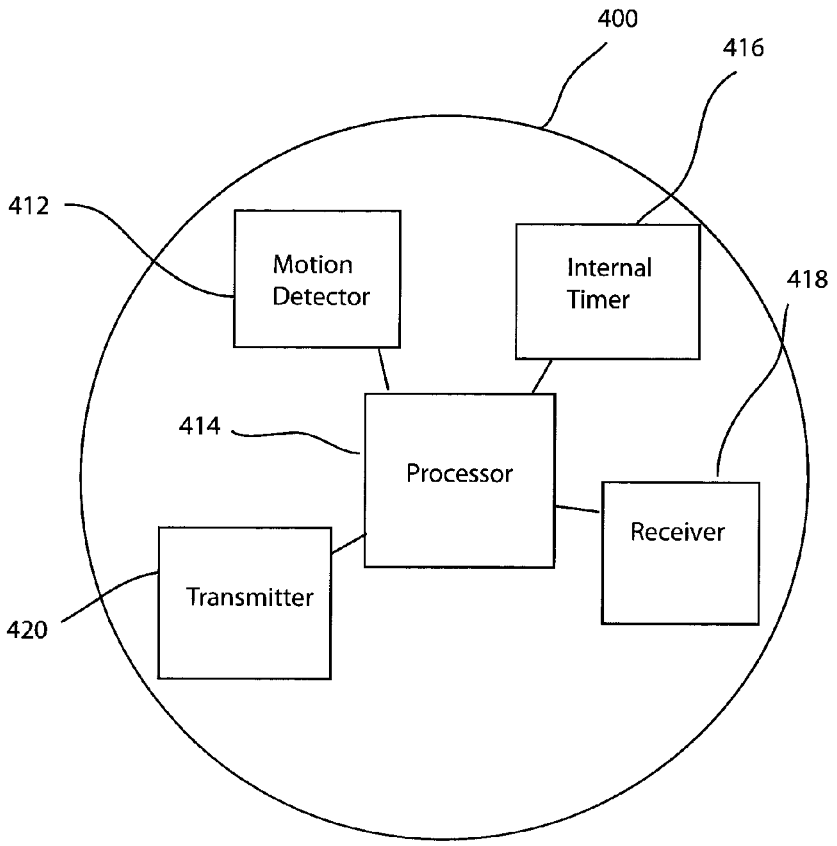
FIG. 7 depicts a schematic view of a device in accordance with one embodiment.

In FIG. 7, another embodiment of a device 400 is shown. In this embodiment, the functionality described hereinabove is incorporated into a wall or ceiling mounted smoke alarm 400. Alternately, in this embodiment, the functionality above may be incorporated in a device which is mountable on a ceiling in a similar manner to a ceiling amounted smoke alarm, as described herein. In one embodiment, the smoke alarm device or smoke detector 400 may be either an ionization or a photoelectric smoke alarm, for example. In this embodiment, the smoke alarm device 400 may include a motion detector 412, a processor 414, and an internal timer 416 as described hereinabove. Further, the device 400 may include a receiver 418 and a transmitter 420 for sending and receiving signals to other outside devices such as the monitoring headend 210. Thus, it should be understood that any of the devices 10, 300, 400 described herein may be attachable to the wall, ceiling, countertop, or the like.

In an embodiment where the device 400 is configured to be attachable to a ceiling, the device 400 may be controllable by a separate handheld controller (not shown), remote or "clicker." The controller may be configured to utilize a user interface which may adjust the timer for the alarm, and the temperature parameters. In some embodiments, the handheld controller may be configured to move the direction that the motion detector 412 is facing, or the direction in which the heat sensor or smoke detector is facing. Thus, the motion detector 412, heat sensor, and smoke detector components may actually be a movable component within the housing of the rest of the device 400. For example, the motion detector may be a circular lens resembling an eyeball, which is configured to rotate based on an input from the controller or other user interface. It should be understood that this movable motion detector 412 may be applied to any of the embodiments of devices described herein.

Still further, components of the systems described herein may be separate from each other. For example, the heat sensor may be located in a component which is located near the stove. The motion detector may, for example, be located across the room from the heat sensor and the stove in order to give the best movement reading for the house or room in question. The alarm may be located on the ceiling next to or within a smoke or carbon alarm. Still further, some or all of the components of the device 10, 300, 400 may be located within a stove or oven. In this way, the device 10, 300, 400 may be integrated into the cook top control panel.

Figure 8:
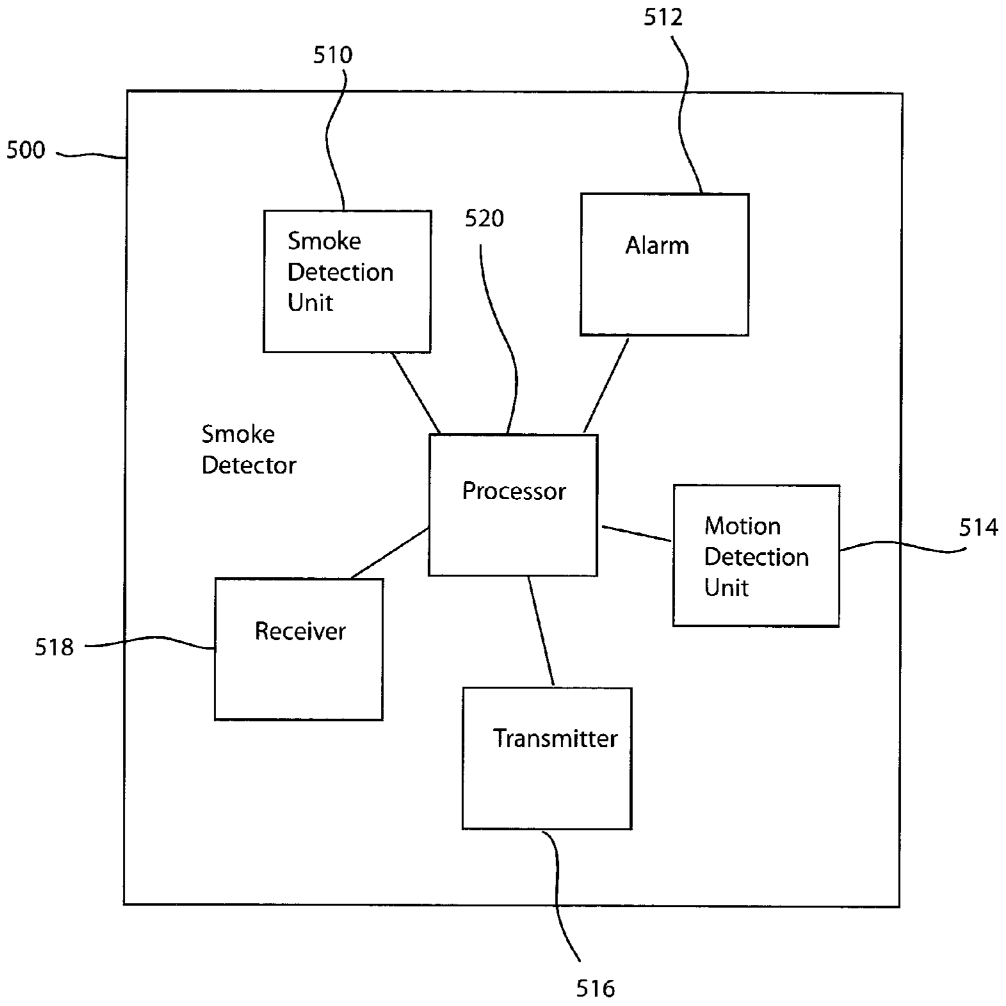
FIG. 8 depicts a schematic view of a device in accordance with one embodiment.

In yet another embodiment, a smoke detector or smoke alarm device 500 is contemplated as shown in FIG. 8. The smoke detector 500 may include a smoke detection unit 510, an alarm 512, a motion detection unit 514, a transmitter 516 and a receiver 518. Each of these components may be in operable (both wired or wireless) communication with a processor 520. In practice, the smoke detector 500 may include a countdown mechanism on the timer in a similar manner described hereinabove with the device 10. The smoke detector 500 may therefore prevent the alarm 512 from sounding even if smoke was detected by the smoke detection unit 510 if movement was determined to be present in the vicinity of the smoke by the motion detector unit 514. In this embodiment, no countdown may exist. Rather, the smoke detector 500 may simply first send an immediate inquiry to the motion detection unit 514 as to whether there is motion in the vicinity of the smoke detector 500, when smoke is present. The smoke detector 500 may then refrain from sounding the alarm. The smoke detector 500 may further have a heat sensor unit 520 therein which may be pointed at the oven or stove. This heat sensor 520 may help the smoke detector 500 from determining a situation that was a real fire, versus a situation where the oven or stove was creating harmless cooking smoke. Thus, if a heat sensor 520 detects cooking level heat coming from the stove while the smoke detection unit 510 detects smoke, the motion sensing unit 514 may be initialized to sense motion.

However, if there is no heat sensed from the oven or stove, the smoke detector 500 may sound the alarm 512 whether or not motion is sensed by the motion detector unit 514. This may prevent the smoke detector 500 from failing to sound an alarm in the case of a real fire even if motion was present. This is because not all motion may result in actual awareness of a fire, such as if a child or baby was moving around in a room where a fire was starting. Still further, if cooking smoke and movement are each detected by the smoke detector 500 but the movement later stops, a countdown may be enacted. Upon reaching the end of the countdown with no further movement, the smoke alarm 500 may sound the alarm. This countdown may, for example, be a minute long.

In still another embodiment, the device 10, 300, 400, 500 may include additional timer capabilities. In the previously described embodiments, a timer would begin a countdown when a heat sensor detected a certain degree of heat. The countdown would be reset each time a motion detector detected movement. Additional timers may also be configured on the device 10, 300, 400, 500. For example, the first previously described timer may be configured with a certain time-length if the heat sensor senses head below a certain temperature. However, an additional timer may be included for a shorter time length if the heat sensor senses heat above the certain temperature. In this way, several timers may be set dependent on the heat that is detected. The greater the heat being detected, the less amount of time that the timer may count down from before an alarm is set.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A system for monitoring a heating apparatus comprising:

a motion detector configured to determine whether a person is proximate the heating apparatus, wherein the motion detector is default deactivated;

a heat sensor configured to determine whether the heating apparatus has a temperature that is above a threshold, wherein the heat sensor is default deactivated;

a processor in operable communication with each of the motion detector and the heat sensor configured to cyclically repeat a first countdown, and wherein the heat sensor is temporarily activated once during each of the repeated first countdowns, and wherein the processor is configured to perform a second countdown when the activated heat sensor determines that the heating apparatus has the temperature that is above the threshold, and wherein the second countdown is reset each time the motion detector determines that a person is proximate the heating apparatus;

a transmitter configured to send data signals to an outside device when the processor reaches the end of the second countdown; and a receiver configured to receive data signals from the outside device.

2. The system of claim 1, wherein the system is housed within a single housing.

3. The system of claim 1, wherein the system further includes an alarm in operable communication with the processor, the alarm configured to notify a user when the processor reaches the end of the second countdown.

4. The system of claim 3, wherein the alarm operates with a hierarchy of increasingly intrusive warnings.

5. The system of claim 1, further comprising a stationary base component having a cavity, wherein the motion detector rests within the cavity of the base component, wherein the cavity is keyed such that the motion detector is directionally positioned by the cavity to point in a proper direction.

6. The system of claim 1, further comprising a smoke detector and a carbon detector each in operable communication with the processor.

7. The system of claim 6, wherein the smoke detector and the carbon detector are activated after the processor reaches the end of the second countdown.

8. The system of claim 1, wherein the outside device is a monitoring headend and wherein the system further includes a plurality of homes each having a unit, the unit including a motion detector, a heat sensor, a processor, a transmitter, and a receiver, the unit in operable communication with the headend.

9. The system of claim 1, wherein the outside device is at least one of a cell phone, television, satellite, tablet, desktop computer, and laptop computer.

10. The system of claim 1, wherein the received data signals from the outside device are configured to turn on at least one of the motion detector, the heat sensor and the processor.

11. The system of claim 1, wherein the motion detector includes a camera, and wherein the camera is viewable remotely by the outside device.

12. A method for monitoring a heating apparatus, the method comprising:

repeating a first countdown of a first set period with a processor;

activating a heat sensor at the end of each of the repeated first countdowns, the heat sensor configured to determine whether the heating apparatus has a temperature that is above a threshold;

performing a second countdown of a second set period with the processor when the heat sensor determines that the heating apparatus has the temperature that is above the threshold;

detecting motion with a motion sensor when the heat sensor determines that the heating apparatus has a temperature that is above the threshold;

resetting the second countdown when motion is detected by the motion sensor;

transmitting data signals to an outside device when the processor reaches the end of the second countdown; and receiving data signals from the outside device.

13. A device for monitoring a heating apparatus comprising:

a motion detector configured to determine whether a person is proximate the heating apparatus, wherein the motion detector is default deactivated;

a heat sensor configured to determine whether the heating apparatus has a temperature that is above a threshold, wherein the heat sensor is default deactivated;

a processor in operable communication with each of the motion detector and the heat sensor configured to cyclically repeat a first countdown, and wherein the heat sensor is temporarily activated once during each of the repeated first countdowns, and wherein the processor is configured to perform a second countdown when the activated heat sensor determines that the heating apparatus has the temperature that is above the threshold, and wherein the second countdown is reset each time the motion detector determines that a person is proximate the heating apparatus;

a transmitter configured to send data signals to an outside device when the processor reaches the end of the second countdown; and a receiver configured to receive data signals from the outside device.

14. The device of claim 13, further comprising an alarm in operable communication with the processor, the alarm configured to notify a user when the processor reaches the end of the second countdown.

15. The device of claim 14, wherein the alarm operates with a hierarchy of increasingly intrusive warnings.

16. The device of claim 13, further comprising a stationary base component having a cavity, wherein the motion detector rests within the cavity of the base component, wherein the cavity is keyed such that the motion detector is directionally positioned by the cavity to point in a proper direction.

17. The device of claim 13, further comprising a smoke detector and a carbon detector each in operable communication with the processor.

18. The device of claim 17, wherein the smoke detector and the carbon detector are activated after the processor reaches the end of the second countdown.

19. The device of claim 13, wherein the outside device is a monitoring headend and wherein the system further includes a plurality of homes each having a unit, the unit including a motion detector, a heat sensor, a processor, a transmitter, and a receiver, the unit in operable communication with the headend.

20. The device of claim 13, wherein the motion detector includes a camera, and wherein the camera is viewable remotely by the outside device.

* * * * *

UNITED STATES PATENT AND TRADEMARK OFFICE

CERTIFICATE OF CORRECTION

PATENT NO. : 8,921,743 B2
APPLICATION NO. : 14/107720
DATED : December 30, 2014
INVENTOR(S) : Robert C. Ewell et al.

It is certified that error appears in the above-identified patent and that said Letters Patent is hereby corrected as shown below:

In the Drawings:

In Figure 2, Box 14 replace the words “Motion Defector” with “Motion Detector.”

In the Specification:

In Column 6, Line 47 replace the word “headed” with the word “headend.”

In Column 7, Line 6 replace the word “headed” with the word “headend.”

In Column 7, Line 15 replace the word “headed” with the word “headend.”

In Column 7, Line 36 replace the word “headed” with the word “headend.”

In Column 7, Line 54 insert the word --the-- after the word “reaches.”

In Column 9, Line 19 replace the word “headed” with the word “headend.”

Signed and Sealed this
Eighteenth Day of August, 2015

Michelle K. Lee
*Director of the United States Patent and Trademark Office*